(12) United States Patent
Jojic et al.

(10) Patent No.: US 9,327,243 B2
(45) Date of Patent: *May 3, 2016

(54) AIRCRAFT FUEL TANK FLAMMABILITY REDUCTION METHODS AND SYSTEMS

(71) Applicant: The Boeing Company, Huntington Beach, CA (US)

(72) Inventors: Ivana Jojic, Bellevue, WA (US); Donald R Snow, Jr., Fountain Valley, CA (US); Alan Grim, Lake Stevens, WA (US); Colin W Hart, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,058

(22) Filed: Sep. 4, 2014

(65) Prior Publication Data

US 2015/0000523 A1    Jan. 1, 2015

Related U.S. Application Data

(63) Continuation-in-part of application No. 13/594,525, filed on Aug. 24, 2012, now Pat. No. 9,061,249.

(51) Int. Cl.
*B01D 53/22* (2006.01)
*B01D 63/02* (2006.01)
(Continued)

(52) U.S. Cl.
CPC ............. *B01D 63/02* (2013.01); *B01D 71/021* (2013.01); *B64D 37/32* (2013.01); *B01D 53/228* (2013.01);
(Continued)

(58) Field of Classification Search
CPC .... B01D 53/228; B01D 63/02; B01D 71/021; B01D 2053/224; B01D 2257/104; B01D 2256/10; B01D 2311/04; B01D 2311/106; B01D 2259/4575; B01D 2259/4566; B64D 37/32; Y02T 50/44; F28F 1/00
See application file for complete search history.

(56) References Cited

U.S. PATENT DOCUMENTS 2,099,913 A    11/1937  Edouard et al.
2,321,445 A *   6/1943  Yendall ..................... F25J 3/04
                                                        62/48.1

(Continued)

FOREIGN PATENT DOCUMENTS

EP        2520493       11/2012
WO    WO2006079782       8/2006

OTHER PUBLICATIONS

Singh, Rachana, Koros, William J; Carbon Molecular Sieve Membrane Performance Tuning by Dual Temperature Secondary Oxygen Doping (DTSOD); Journal of Membrane Science, vol. 427, pp. 472-478; Jan. 15, 2013.

(Continued)

*Primary Examiner* — Jason M Greene
*Assistant Examiner* — Anthony Shumate
(74) *Attorney, Agent, or Firm* — Parsons Behle & Latimer

(57) ABSTRACT

An aircraft fuel tank flammability reduction method includes feeding pressurized air into an air separation module containing an oxygen separation membrane. The method includes contacting the separation membrane with the air feed, permeating oxygen from the air feed through the separation membrane, and producing nitrogen-enriched air from the air separation module as a result of removing oxygen from the air feed. The NEA from the air separation module is substantially cooled in a NEA flow heat exchanger and the substantially cooled, nitrogen-enriched air is fed into the fuel tank on board the aircraft. An aircraft fuel tank flammability reduction system includes a NEA flow heat exchanger configured to cool substantially the nitrogen-enriched air from the air separation module and a fuel tank on board the aircraft configured to receive the cooled nitrogen-enriched air.

20 Claims, 4 Drawing Sheets

US 9,327,243 B2
Page 2

(51) Int. Cl.
*B01D 71/02* (2006.01)
*B64D 37/32* (2006.01)

(52) U.S. Cl.
CPC ....... *B01D 2053/224* (2013.01); *B01D 2256/10* (2013.01); *B01D 2257/104* (2013.01); *B01D 2311/04* (2013.01); *Y02T 50/44* (2013.01)

(56) References Cited

U.S. PATENT DOCUMENTS

| | | | |
|---|---|---|---|
| 2,556,632 A * | 6/1951 | Powell | 165/119 |
| 2,579,498 A * | 12/1951 | Jenny | F25J 3/04 62/646 |
| 2,960,834 A * | 11/1960 | Kirk Patrick | F25J 3/0426 60/257 |
| 3,059,438 A * | 10/1962 | Schilling | F25J 3/04018 62/650 |
| 3,123,457 A * | 3/1964 | Smith | F25J 3/04218 62/645 |
| 3,399,720 A * | 9/1968 | Doelz et al. | 165/166 |
| 3,413,095 A | 11/1968 | Bramson | |
| 4,230,463 A * | 10/1980 | Henis et al. | 95/47 |
| 4,378,920 A * | 4/1983 | Runnels et al. | 244/135 R |
| 4,474,199 A * | 10/1984 | Blaudszun | B08B 7/0092 134/1 |
| 4,497,365 A * | 2/1985 | Boyer | 165/164 |
| 4,681,602 A * | 7/1987 | Glenn et al. | 95/47 |
| 4,681,605 A * | 7/1987 | Gollan | 96/13 |
| 4,983,191 A * | 1/1991 | Ekiner et al. | 96/14 |
| 5,015,270 A * | 5/1991 | Ekiner et al. | 95/54 |
| 5,076,837 A * | 12/1991 | Rathbone | C01B 3/36 48/197 R |
| 5,085,676 A * | 2/1992 | Ekiner et al. | 96/13 |
| 5,096,468 A * | 3/1992 | Minhas | 95/51 |
| 5,101,656 A | 4/1992 | Miller | |
| 5,743,259 A | 4/1998 | Kruse et al. | |
| 5,979,183 A * | 11/1999 | Smith | F02C 1/04 60/39.12 |
| 6,141,950 A * | 11/2000 | Smith | F01K 23/064 60/39.182 |
| 6,151,914 A * | 11/2000 | Mizuno | B01D 53/002 62/648 |
| 6,299,669 B1 | 10/2001 | Koros et al. | |
| 6,425,267 B1 | 7/2002 | Baker et al. | |
| 6,565,626 B1 | 5/2003 | Baker et al. | |
| 6,565,631 B2 | 5/2003 | Koros et al. | |
| 6,656,127 B1 | 12/2003 | Ben-oren et al. | |
| 6,913,636 B2 | 7/2005 | Defrancesco et al. | |
| 6,997,013 B2 | 2/2006 | Jones | |
| 7,070,941 B2 | 7/2006 | Zhao et al. | |
| 7,081,153 B2 | 7/2006 | Leigh et al. | |
| 7,152,635 B2 | 12/2006 | Moravec et al. | |
| 7,204,868 B2 | 4/2007 | Snow, Jr. | |
| 7,404,844 B2 | 7/2008 | Tin et al. | |
| 7,442,230 B2 | 10/2008 | Snow, Jr. | |
| 7,481,214 B2 | 1/2009 | Eilers | |
| 7,547,349 B2 * | 6/2009 | Lessi | 95/130 |
| 7,625,434 B2 * | 12/2009 | Tom et al. | 96/4 |
| 8,398,755 B2 | 3/2013 | Coan et al. | |
| 8,623,124 B2 | 1/2014 | Hosseini et al. | |
| 8,709,133 B2 | 4/2014 | Kiyono et al. | |
| 8,778,062 B1 * | 7/2014 | Snow, Jr. | 96/135 |
| 8,801,831 B1 * | 8/2014 | Snow et al. | 95/1 |
| 8,840,704 B2 * | 9/2014 | Shoji et al. | 95/115 |
| 8,882,886 B2 * | 11/2014 | Evosevich et al. | 95/54 |
| 9,062,149 B2 * | 6/2015 | Hupka | C08G 18/10 |
| 2002/0033096 A1 | 3/2002 | Koros et al. | |
| 2002/0189445 A1 | 12/2002 | Miller et al. | |
| 2003/0116679 A1 * | 6/2003 | Susko | 244/135 R |
| 2004/0025507 A1 * | 2/2004 | Leigh et al. | 60/608 |
| 2005/0235825 A1 | 10/2005 | Tin et al. | |
| 2006/0218967 A1 * | 10/2006 | Le Bot | F25J 1/0025 62/614 |
| 2009/0178408 A1 * | 7/2009 | Brugerolle | F25J 3/0406 60/645 |
| 2009/0229701 A1 * | 9/2009 | Allidieres | F17C 5/06 141/2 |
| 2009/0302163 A1 | 12/2009 | Sanford | |
| 2010/0251763 A1 * | 10/2010 | Audun | B63B 25/16 62/614 |
| 2011/0117000 A1 * | 5/2011 | Nakatani | B01D 53/8643 423/239.1 |
| 2012/0116249 A1 | 5/2012 | Mcguckin, Jr. | |
| 2013/0152793 A1 | 6/2013 | Bhuwania et al. | |
| 2014/0000454 A1 | 1/2014 | Singh et al. | |
| 2014/0116249 A1 * | 5/2014 | Evosevich et al. | 95/47 |
| 2014/0326135 A1 * | 11/2014 | Massey et al. | 95/39 |
| 2015/0027305 A1 * | 1/2015 | Evosevich et al. | 95/47 |

OTHER PUBLICATIONS

Ismail, et al al: "Understanding the solution-diffusion mechanism in gas separation membrane for engineering students;" Regional Conference on Engineering Education RCEE 2005, Dec. 12-13, 2005, Johor, Malaysia Dec. 12, 2005.
Lee, Young Moo; "Thermally Rearranged Polymer Membranes with Cavities: A New Opportunity?," Aug. 20, 2008, 31 pages.
Vu, De Q., et al; "Mixed matrix membranes using carbon molecular sieves I. Preparation and experimental results;" Journal of Membrane Science 211, pp. 311-334; 2003.
Steel, Keisha, Koros, William; "Investigation of porosity of carbon materials and related effects on gas separation properties;" Carbon 41, pp. 253-266; 2003 Jan. 1, 2003.
Kim, Youn Kook, et al; "The Gas Separation Properties of Carbon molecular Sieve Membranes Derived from Polyimides Having Carboxylic Acid Groups;" Journal of Membrane Sciences 235; Elsevier; 2004; pp. 139-146. Nov. 20, 2003.
Williams, P. Jason; et al; "Gas Separation by Carbon Membranes;" Advanced Membrane Technology and Applications; John Wiley & Songs Inc., 2008; pp. 599-627. Jan. 1, 2008.
Saufi, S.M., et al; "Fabrication of Carbon Membranes for Gas Sepration—A Review;" Carbon 42; Elsevier; 2004; pp. 241-259. Apr. 14, 2003.
Kiyono, Mayumi, et al; "Effect of Pyrolysis Atmosphere on Separation Performance of Carbon Molecular Sieve Membranes;" Journal of Membrane Science 359; Elsevier; 2010; pp. 2-10. May 31, 2009.
Hagg, May-Britt, et al; "Carbon Molecular Sieve Membranes: A Promising Alternative for Selected Industrial Applications;" Ann. N.Y. Acad. Scie. 984; 2003; pp. 329-345. Jan. 1, 2003.
International Searching Authority; ISR—WO for Appl No. PCT/US2013/052133 dtd Apr. 22, 2014, 12 pgs.
US Patent and Trademark Office; Office Action for U.S. Appl. No. 13/594,525 dtd Jul. 3, 2014, 19 pgs.
Park, Ho Bum, et al., Thermally rearranged (TR) polymer membranes for CO2 separation; Journal of Membrane Science 359, 2010, pp. 11-24 Oct. 14, 2009.
Sanders, David F. et al., "Influence of polyimide precursor synthesis route and ortho-position functional group on thermally rearranged (TR) polymer properties: Pure gas permeability and selectivity;" Journal of Membrane Science 463, 2014, pp. 73-81 Mar. 22, 2014.
Ismail, et al al: "Understanding the solution-diffusion mechanism in gas separation membrane for engineering students;" Regional Conference on Engineering Education RCEE 2005, Dec. 12-13, 2005, Johor, Malaysia Dec. 12, 2005, 6 pgs.
Ismail, A.F., David, L.I.B.; "A Review on the latest development of carbon membranes for gas separation;" Journal of Membrane Science 193, pp. 1-18; 2001 May 1, 2001.

* cited by examiner

US 9,327,243 B2

AIRCRAFT FUEL TANK FLAMMABILITY REDUCTION METHODS AND SYSTEMS

RELATED PATENT DATA

The present application is a continuation-in-part of U.S. patent application Ser. No. 13/594,525, filed Aug. 24, 2012, entitled "Aircraft Fuel Tank Flammability Reduction Method and System," which is incorporated herein by reference.

TECHNICAL FIELD

The methods and systems herein pertain to aircraft fuel tank flammability reduction, including methods and systems that substantially cool nitrogen-enriched air from an air separation module.

BACKGROUND

A variety of known systems exist with the purpose of reducing flammability in aircraft fuel tanks. Such systems may be known by a number of designations including, but not limited to, On-Board Inert Gas Generation System (OBIGGS), Nitrogen Generation System (NGS), Flammability Reduction System (FRS), Fuel Tank Inerting System (FTIS), etc. However, a commonality among the systems involves reducing the oxygen content of fuel tank ullage by feeding an oxygen-depleted gas into the fuel tank. Fuel tank ullage is a region in the tank that often contains evaporated fuel (fuel vapor). Often, the systems produce nitrogen-enriched air (NEA), also called oxygen-depleted air (ODA), as the oxygen-depleted gas. The NEA reduces flammability of the fuel tank ullage since ullage with lower oxygen content is less flammable.

Inerting systems used to produce nitrogen-enriched air may rely on diffusion through polymer membranes, or other separation mechanisms, to remove oxygen. In systems with polymer hollow fiber membranes, compressed air enters the bore of the polymer hollow fiber and oxygen permeates through the walls of the polymer hollow fiber. The oxygen-enriched permeate is collected and exhausted overboard. The remaining nitrogen-enriched retentate flows through the bore and is collected at the air separation module product gas outlet for distribution to aircraft fuel tanks. Unfortunately, service life of the air separation module and the system operating conditions may be limited by, among other factors, the polymers used in construction of the air separation module. Accordingly, increased reliability of air separation modules is desirable.

SUMMARY

An aircraft fuel tank flammability reduction method includes feeding pressurized air into an air separation module containing an oxygen separation membrane. The method includes contacting the separation membrane with the air feed, permeating oxygen from the air feed through the separation membrane, and producing nitrogen-enriched air from the air separation module as a result of removing oxygen from the air feed. The nitrogen-enriched air (NEA) from the air separation module is substantially cooled in a NEA flow heat exchanger and the substantially cooled, nitrogen-enriched air is fed into the fuel tank on board the aircraft.

An aircraft fuel tank flammability reduction system includes a source configured to produce pressurized air, an air separation module configured to receive air feed from the pressurized air source, and an oxygen separation membrane in the air separation module. The oxygen separation membrane is configured to permeate oxygen from the air feed through the separation membrane and to produce nitrogen-enriched air (NEA) from the air separation module as a result of removing oxygen from the air feed. The system includes a NEA flow heat exchanger configured to cool substantially the nitrogen-enriched air from the air separation module and a fuel tank on board the aircraft configured to receive the cooled nitrogen-enriched air.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1:
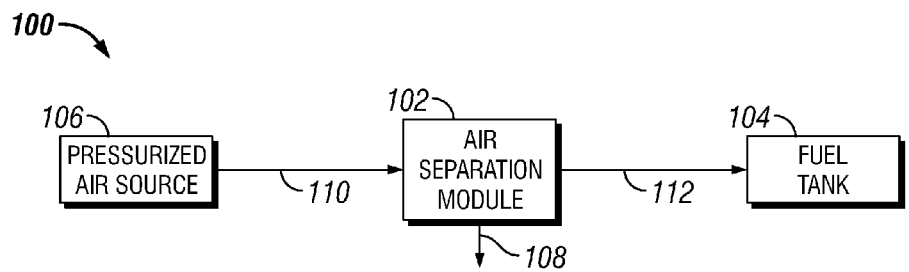
FIG. 1 is a schematic diagram of an aircraft fuel tank flammability reduction system.

Polymer hollow fiber membranes (HFMs) for gas separation used in air separation modules (ASMs) can be susceptible to particulate, gaseous, and liquid contaminants, which may affect module performance and may limit service life. Aircraft fuel tank inerting systems, long used in military aircraft and recently developed for commercial aircraft to comply with Federal Aviation Administration (FAA) regulations, use polymer hollow fiber ASMs to remove oxygen from air and to produce nitrogen-enriched air for fuel tank flammability reduction. The operation temperature in known gas separation technology may be affected by the fiber's thermoplastic polymer and the change in fiber performance characteristics, such as permeability and selectivity (productivity and efficiency), as a function of temperature. The kind of thermoset materials used in manufacturing the air separation module tubesheet to hold (seal) the bundle of fibers may also affect operation temperature.

The return of in-service ASMs is often associated with failures due to thermal cycling and/or overheating. Research is underway on ASM technology to enable higher temperature operation. However, higher temperature operation produces higher temperature nitrogen-enriched air. The apparatuses and methods herein provide architecture to incorporate gas separation technology that operates at higher temperature with various cooling techniques for the separated gas.

In further detail, materials used for polymer hollow fiber membranes and tubesheets that support the fiber bundle are often polymerized organic compounds containing carbon, hydrogen, oxygen, and possibly other elements. For a given polymer fiber, the range of operating temperature is limited by the fiber performance (selectivity and permeability for a given gas separation pair) and by the materials (especially the tubesheet materials) used to manufacture the separation module. Selectivity is a ratio of permeabilities of a pair of gases. For a given gas separation pair, a tradeoff exists between permeability and selectivity. Namely, the polymeric membrane has an upper bound, known among those of ordinary skill as a Robeson Upper Bound. For a polymer, permeability increases with temperature while selectivity decreases.

For polymeric membranes known in aerospace applications, normal operating temperature is often less than 96° C. (205° F.). Gas flux through a separation layer within the membrane depends on separation layer thickness (manufacturing dependent), polymer properties (permeability), and operating conditions. The higher the permeability, the lower the membrane area used to produce a given flux at a given difference in partial pressures of a gas across the membrane. Since permeability increases with temperature, the operating temperature limit to achieve desired service life effectively imposes a limit on permeability.

Thermoset polymers, such as epoxies, are often used for tubesheet materials of known gas separation modules. The tubesheet material secures a bundle of polymer hollow fibers and enables packaging and sealing the bundle into a canister. The maximum operating temperature in known polymer membranes is limited by the manufacturing (such as curing) temperature of the tubesheet material. Even though higher temperature materials exist, the choice of materials that can be manufactured with the hollow fiber membranes and that are practical in aerospace applications are limited in their long term operating temperature to less than 96° C. (205° F.). A system exceeding the temperature limit results in degradation of the tubesheet material and, ultimately, shorter service life of the gas separation module.

Permeability loss may also occur over the operational life of an air separation module using polymer hollow fiber membranes. As with most polymers, physical aging (natural relaxation of the polymer chains) leads to reduction of free volume and loss of permeability and, hence, loss of flux. This change in performance during the service life of the module affects sizing of the system components (such as a heat exchanger). Polymers with high permeability have larger free volume and exhibit more physical aging (unless they are of semi-crystalline morphology). Higher permeability implies less fiber area needed. Therefore, a membrane with high permeability and less physical aging is desired.

In addition, polymer hollow fibers are susceptible to contaminants. Filtration is often used to remove liquids and particulate aerosols. Certain gaseous contaminants can further reduce the permeability and, accordingly, performance and, in sufficient concentration, ultimately affect service life. Condensable gases, depending on their partial pressure in the feed stream and their dew point at the operating temperature, may also deteriorate performance and reduce service life. Because permeability of gaseous contaminants in general also depends on temperature (with the exception of contaminants that chemically react with polymer and/or break polymer chains, such as ozone) and dew point does as well, higher temperature of operation is desired.

Increasing the system operating temperature lessens the desire to reduce air feed temperature and, hence, also has positive effects on sizing of system components (smaller heat exchangers and smaller ram air demands, reducing weight and drag). Higher permeability, however, often increases the feed flow used to reach the desired retentate conditions. To offset that, a membrane with higher selectivity is desired. More nitrogen is therefore retained in the retentate (NEA) and decreases the feed flow rate used.

The increased efficiency in separation of oxygen from air results in less feed air to obtain the same amount of nitrogen-enriched air. Less feed air yields increased aircraft fuel efficiency. More efficient separation also permits the air separation module to be smaller in size and lighter in weight.

Permeability of known polymer hollow fibers increases with higher temperature. New fibers discussed below are able to withstand higher operating temperature during manufacturing, which enables use of higher temperature tubesheet materials with higher thermal stability than known tubesheet materials (often epoxies) used in the gas separation industry. Higher operating temperature enables design of a lighter weight system via two means: (1) higher performance enables less surface area of active fiber (smaller air separation module or fewer modules per aircraft) and (2) less inlet heat exchanger capacity (use of a smaller inlet heat exchanger or no inlet heat exchanger).

In addition, higher thermal stability materials with beneficial mechanical properties can be used in the air separation module design and the life of the unit can be extended beyond the known modules, which increases reliability and decreases maintenance cost of the system.

FIG. 1 shows a system 100 in which the methods and other systems herein may be implemented. System 100 includes an air separation module (ASM) 102 that may include the gas separation module of FIGS. 5 and 6. An air source 106 may be pressurized, as shown in FIG. 1, or at ambient pressure. Even so, separation efficiency often increases with increasing pressure, as in the case of hollow fiber membrane production of nitrogen-enriched air. Air source 106 provides air feed 110 to ASM 102, which produces permeate 108 and nitrogen-enriched air 112. A fuel tank 104 enables receipt of nitrogen-enriched air 112 to reduce flammability of fuel tank ullage. System 100 may be used in or included in the apparatuses and methods described herein.

Figure 5:
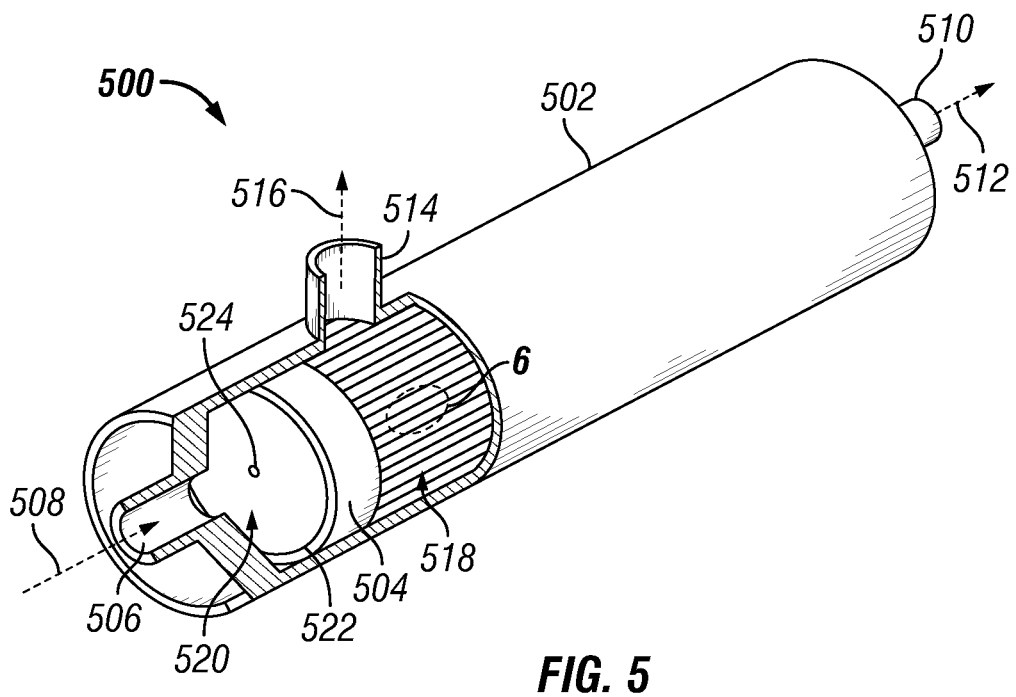
FIGS. 5 and 6 are perspective views of a gas separation module.
Figure 6:
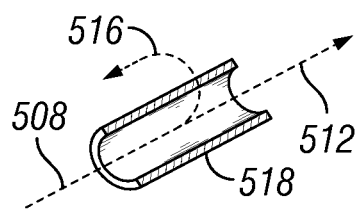

FIGS. 5 and 6 show a known gas separation module 500 including a shell 502 in which element 520 is installed. A feed port 506 allows entry of a gas feed 508 to contact inlet tubesheet 522 and enter fibers 518 assembled around a support 524. A rim 504 around inlet tubesheet 522 is provided to seal inlet tubesheet 522 within shell 502. Consequently, gas feed 508 flows into an individual fiber 518 (shown in FIG. 6) to produce permeate 516, which passes through the wall of individual fiber 518. Retentate 512 exits individual fiber 518 at a product (outlet) tubesheet (not shown in FIG. 5) and flows through a retentate port 510 to become nitrogen-enriched air, such as nitrogen-enriched air 112 of FIG. 1. Permeate 516 from each of fibers 518 collects between inlet tubesheet 522 and the product tubesheet and flows through permeate port 514.

The temperature along fibers 518 in the known flow-through design shown in FIGS. 5 and 6 decreases as gas feed 508 flows downstream from inlet tubesheet 522 to the product (outlet) tubesheet (not shown). The temperature profile may depend on the flow rate of gas feed 508 and may drop up to 50° F., or even higher under certain conditions, from inlet tubesheet 522 to the product tubesheet. The cooling may be partly due to the enthalpy of separation of gases associated with one gas permeating preferentially through the membranes of fibers 518 to produce permeate 516 and retentate 512. Also, the cooling may be partly due to a pressure drop as gas feed 508 flows down the length of fibers 518.

Because the efficiency of gas separation through a membrane decreases with decreasing temperature, the decreasing temperature profile along fibers 518 likewise reduces separation efficiency along fibers 518, yielding a related decreasing profile for separation efficiency. By increasing temperature of gas feed 508, temperature along fibers 518 and, accordingly, separation efficiency may also increase. Even so, temperature of retentate 512 and, thus, nitrogen-enriched air 112 may potentially increase beyond a desired temperature for fuel tank 104.

As a result of the above-described limitations of polymer hollow fibers used as membranes in air separation modules, significant benefits may be obtained by extending service life and also by increasing system operating temperature. A membrane with higher permeability and higher selectivity is also desired. In addition to higher selectivity, less sensitivity of selectivity to temperature and/or less sensitivity of selectivity to contamination is desired.

A variety of forthcoming technologies are expected to provide such benefits. For example, carbon membranes described in U.S. patent application Ser. No. 13/594,525, filed Aug. 24, 2012, entitled "Aircraft Fuel Tank Flammability Reduction Method and System," which is herein incorporated by reference, may provide those benefits due to their ability to function at an increased temperature. Also, gas separation membranes made from thermally rearranged (TR) polymers may have a lower carbon content compared to the above-mentioned carbon membranes, but similarly allow increased temperature. For a description of making and using TR polymer membranes for various gas separations, see Sanders, D. F., et al., "Influence of Polyimide Precursor Synthesis Route and Ortho-position Functional Group on Thermally Rearranged (TR) Polymer Properties: Pure Gas Permeability and Selectivity," Journal of Membrane Science, Volume 463, 1 August 2014, Pages 73-81 and Park, H. B., et al., "Thermally Rearranged (TR) Polymer Membranes for $CO_2$ Separation, Journal of Membrane Science, Volume 359, Issues 1-2, 1 Sep. 2010, Pages 11-24. The methods and systems described herein take advantage of the benefits of the forthcoming technologies and allow them to be effectively utilized.

Known inerting systems operate at temperatures low enough that the aircraft structure is protected without additional cooling of the gas separated in the ASM. Ducts upstream of an ASM may be insulated to maintain temperature control and to protect structure. Ducts downstream of the ASM may be insulated where the routing is close to heat sources and not insulated in other areas to allow for temperature drop and lower temperature gas into the fuel tank. In known distribution systems, temperature at the penetration point into fuel tank structures is low enough that no additional cooling of the nitrogen enriched air is used. For the Oxygen Enriched Air (OEA) from the permeate side, known systems often have a short duct routed onto a panel of an epoxy composite fairing configured to tolerate higher temperatures.

Methods and systems herein modify known gas separation systems used for fuel tank flammability reduction by incorporating gas separation technology that operates at higher temperatures. Gas separation materials from advances in hollow fiber manufacturing are leading to new polymers or more exotic polymers that are becoming commercially viable or available, mixed matrix membranes, thermally arranged polymers for gas separation, and carbon hollow fibers.

A higher temperature inerting system may include cooling the product gas routed to the fuel tank to meet desired fuel tank temperature. Methods and systems herein include various ways of cooling NEA from the ASM. The modified gas separation system may be used in an aircraft inerting system or other application.

Listed below are various ways to cool retentate of the Air Separation Module (ASM) in aircraft. In aerospace applications, retentate may be called Nitrogen Enriched Air (NEA) or Oxygen Depleted Air (ODA); the permeate may be called Oxygen Enriched Air (OEA). The mass of NEA flow is often $\frac{1}{5}$-$\frac{1}{2}$ of the feed flow, so the mass flow to be cooled is significantly smaller than that of the feed flow. Even though the OEA flow would also be higher temperature, cooling might not be warranted.

If system design warrants OEA cooling, but OEA is to be discarded overboard, then OEA can be routed into a discarded cooling flow described below, such as a ram duct, and also discarded overboard. If the OEA is not cooled, then the OEA duct may be insulated to protect the surrounding structure, and a panel that the OEA duct goes through before reaching ambient may be a panel suitable for higher temperature operations (often higher temperature polymer composites). If OEA is used for other purposes (not discarded overboard), the cooling methods may be same as the NEA cooling methods below.

An aircraft fuel tank flammability reduction method includes feeding pressurized air into an air separation module containing an oxygen separation membrane. The method includes contacting the separation membrane with the air feed, permeating oxygen from the air feed through the separation membrane, and producing nitrogen-enriched air from the air separation module as a result of removing oxygen from the air feed. The nitrogen-enriched air (NEA) from the air separation module is substantially cooled in a NEA flow heat exchanger and the substantially cooled, nitrogen-enriched air is fed into the fuel tank on board the aircraft.

By way of example, the air feed may exhibit a normal operating temperature of at least about 100° C. (212° F.). The high temperature distinguishes the method from known air separation methods using polymer hollow fiber membranes that operate at a lower temperature to reduce thermal damage to the polymer material of the membrane and/or tubesheet material.

The NEA may be cooled to a normal operating temperature such that NEA temperature from the ASM to the fuel tank does not exceed an ullage temperature limit in the fuel tank nor the limits of downstream materials, such as, structural materials, fluids, lubricants, sealants, etc. Desired NEA normal operating temperature varies depending on configuration of the downstream system as determined by the type of aircraft. However, for example, NEA normal operating temperature may be less than structural temperature requirements (often less than 93° C. (200° F.)). The air feed may exhibit a temperature from about 100° C. (212° F.) to about 204° C. (400° F.). Permeability of the membrane may be higher at such higher temperatures. The thermal stability of the membrane also allows use of different tubesheet material that does not limit operational temperature of the air separation module.

Accordingly, while a variety of membrane structures may be used, the separation membrane may include a hollow fiber membrane. The method may include a feed flow heat exchanger receiving the pressurized air from a source for the pressurized air and substantially cooling the air feed upstream from the air separation module. The method may further include directing the same cooling flow to the NEA flow heat exchanger and the feed flow heat exchanger. The cooling flow may include ram air.

As alternatives, the NEA flow heat exchanger may receive the cooling flow upstream from the feed flow heat exchanger, downstream from the feed flow heat exchanger, or in parallel with the feed flow heat exchanger. Also, the NEA flow heat exchanger may include an inner duct inside an outer duct, the method including flowing the nitrogen-enriched air through the inner duct and flowing the cooling flow of the NEA flow heat exchanger through a gap between the inner duct and the outer duct. The inner duct/outer duct arrangement may be considered a simple form of a countercurrent heat exchanger. The cooling flow of the NEA flow heat exchanger between the inner duct and the outer duct may include the cooling flow to the feed flow heat exchanger.

The method may instead include feeding the pressurized air from a source for the pressurized air into the air separation module without substantially cooling the air feed in a heat exchanger. The insubstantial cooling, if any cooling occurs, is of a degree that may occur incidentally from heat loss during mere transmission of the pressurized air from the source to the air separation module. The heat loss may occur in devices intermediate the source and air separation module, such as a filter, but it is less than would occur in a heat exchanger designed to substantially cool the air feed.

In known systems, a source for pressurized air generally provides air feed at an elevated temperature and it is cooled in a heat exchanger to less than 96° C. (205° F.) normal operating temperature to reduce thermal damage to polymer hollow fibers and/or tubesheet material. Under a "normal operating temperature" allowed by known shutdown mechanisms, transient excursions to higher temperature may occur. The normal operating temperature is thus a temperature exhibited when operating at steady state. Air feed to the air separation module in the methods and systems disclosed herein may exhibit a normal operating temperature of at least about 100° C. (212° F.).

Known methods include feeding NEA from an ASM into a fuel tank without substantially cooling the air feed in a heat exchanger. The insubstantial cooling, if any cooling occurs, is of a degree that may occur incidentally from heat loss during mere transmission of the NEA from the ASM to the fuel tank. The heat loss may occur in devices intermediate the ASM and fuel tank, but it is less than would occur in a heat exchanger designed to substantially cool the NEA. For example, the NEA flow cooling used in the methods and systems herein may reduce the NEA temperature by more than 17° C. (30° F.), such as by more than 28° C. (50° F.). The temperature of substantially cooled NEA may be less than 100° C. (212° F.).

Whether cooling the air feed or not cooling the air feed, the NEA flow heat exchanger may receive a cooling flow selected from among ram air, cabin air, cargo compartment air, ambient air, external air (as when cooled by a skin heat exchanger), and a cooling flow cooled by an environmental control system. As a further alternative, cooling the NEA may include passive, convective cooling by the NEA flow heat exchanger in a compartment containing at least the air separation module and likely a number of other components of an aircraft fuel tank flammability reduction system and/or other systems.

The cooling flow may be gas or liquid. One example of a liquid cooling flow includes the liquid used for liquid cooled electronics. Another example of liquid cooling includes the fuel itself. That is, an air/liquid heat exchanger may reside inside the main fuel tank (in a wing) with NEA flowing through the heat exchanger and the fuel acting as a heat sink in a passive cooling arrangement.

As a benefit of the methods herein, a feed air heat exchanger may be reduced in cooling capacity (and thus reduced in size), if some cooling is warranted. Or the feed air heat exchanger may be eliminated if air feed temperature is within tolerance of the thermal stability for a given membrane. Reducing or eliminating cooling may beneficially increase permeability due to increased thermal energy of the oxygen.

An aircraft fuel tank flammability reduction system includes a source configured to produce pressurized air, an air separation module configured to receive air feed from the pressurized air source, and an oxygen separation membrane in the air separation module. The oxygen separation membrane is configured to permeate oxygen from the air feed through the separation membrane and to produce nitrogen-enriched air (NEA) from the air separation module as a result of removing oxygen from the air feed. The system includes a NEA flow heat exchanger configured to cool substantially the nitrogen-enriched air from the air separation module and a fuel tank on board the aircraft configured to receive the cooled nitrogen-enriched air.

By way of example, the features of the aircraft fuel tank flammability reduction methods described herein may be included as features in the systems herein and vice versa. While a variety of membrane structures may be used, the separation membrane may include a hollow fiber membrane. The oxygen separation membrane may be configured to permeate oxygen at a normal operating temperature of at least about 100° C. (212° F.) The system may further comprise a feed flow heat exchanger configured to receive the pressurized air from the source for the pressurized air and to substantially cool the air feed upstream from the air separation module.

The system may be configured to direct the same cooling flow to the NEA flow heat exchanger and the feed flow heat exchanger. Ram air may be the cooling flow. The NEA flow heat exchanger may be configured to receive the cooling flow upstream from the feed flow heat exchanger. The NEA flow heat exchanger may include an inner duct inside an outer duct, the system being configured to flow the nitrogen-enriched air through the inner duct and to flow the cooling flow of the NEA flow heat exchanger between the inner duct and the outer duct.

Figure 2:
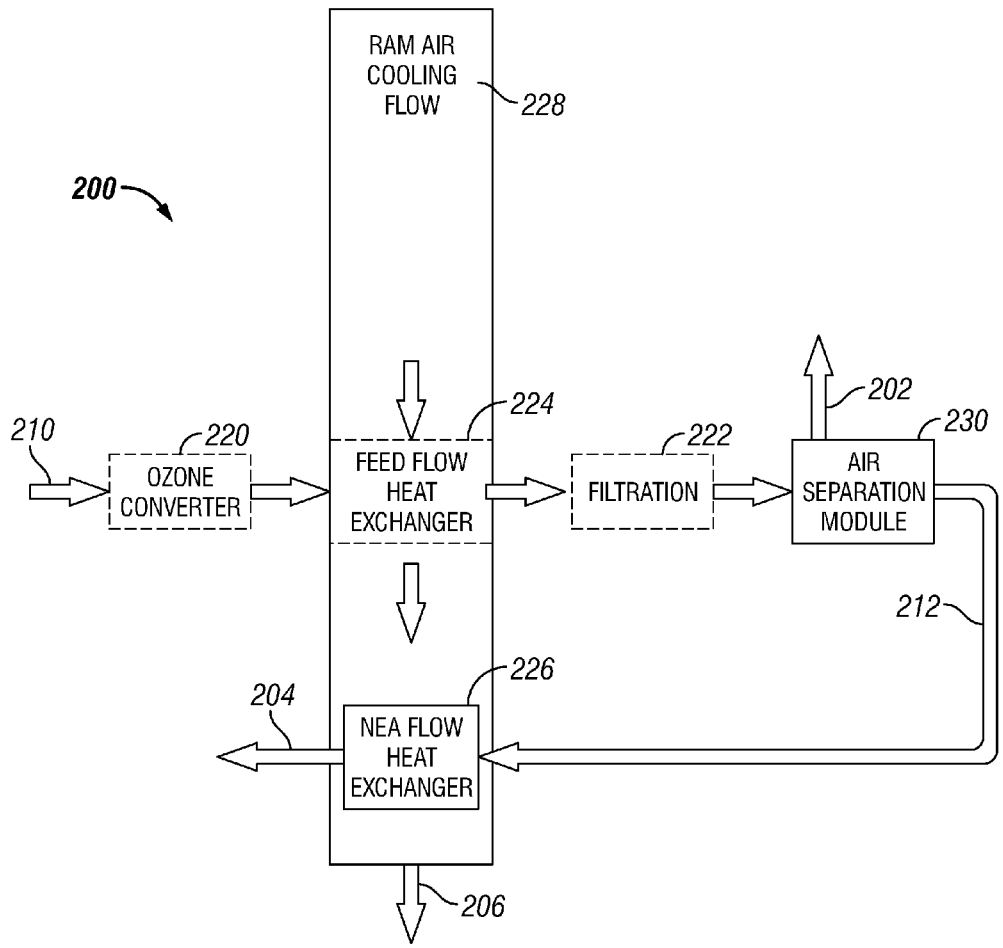
FIGS. 2-4 are schematic diagrams of cooling systems that may be implemented in the system of FIG. 1.
Figure 3:
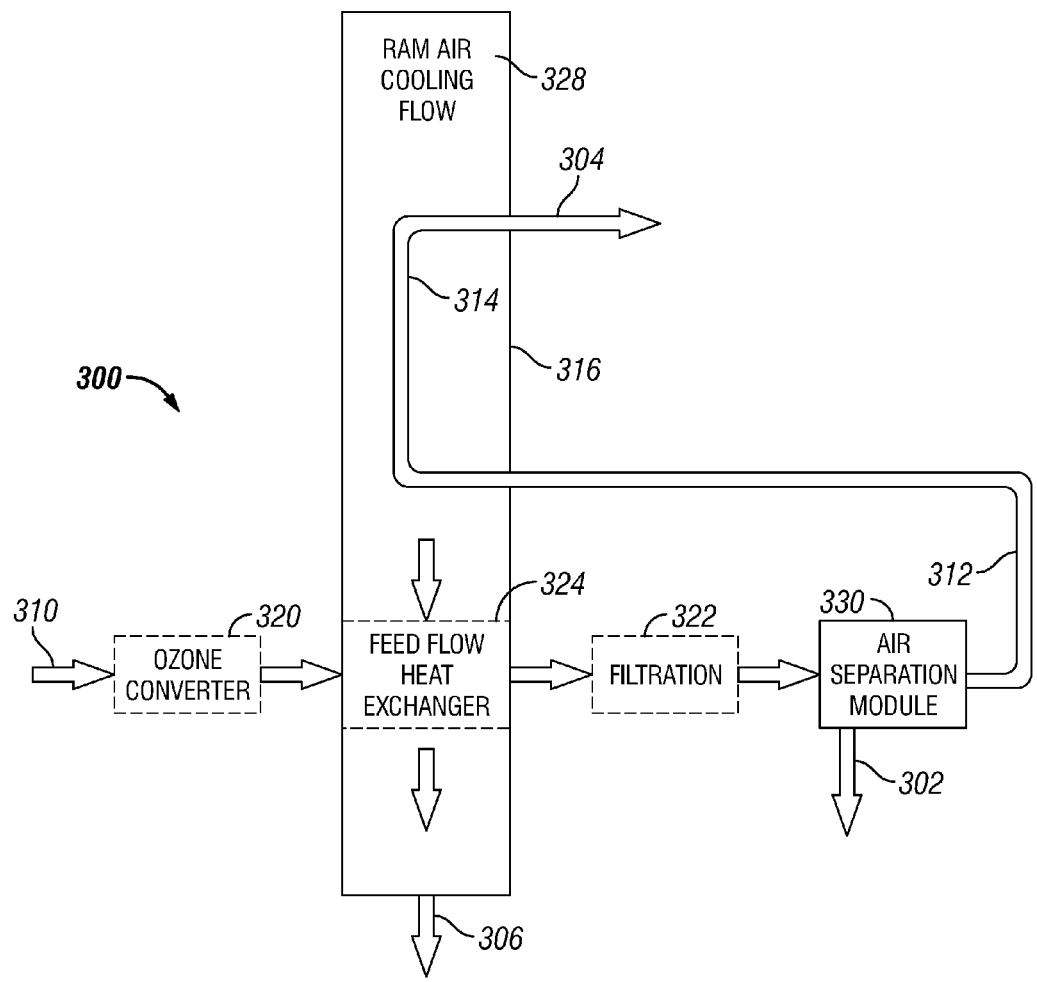
Figure 4:
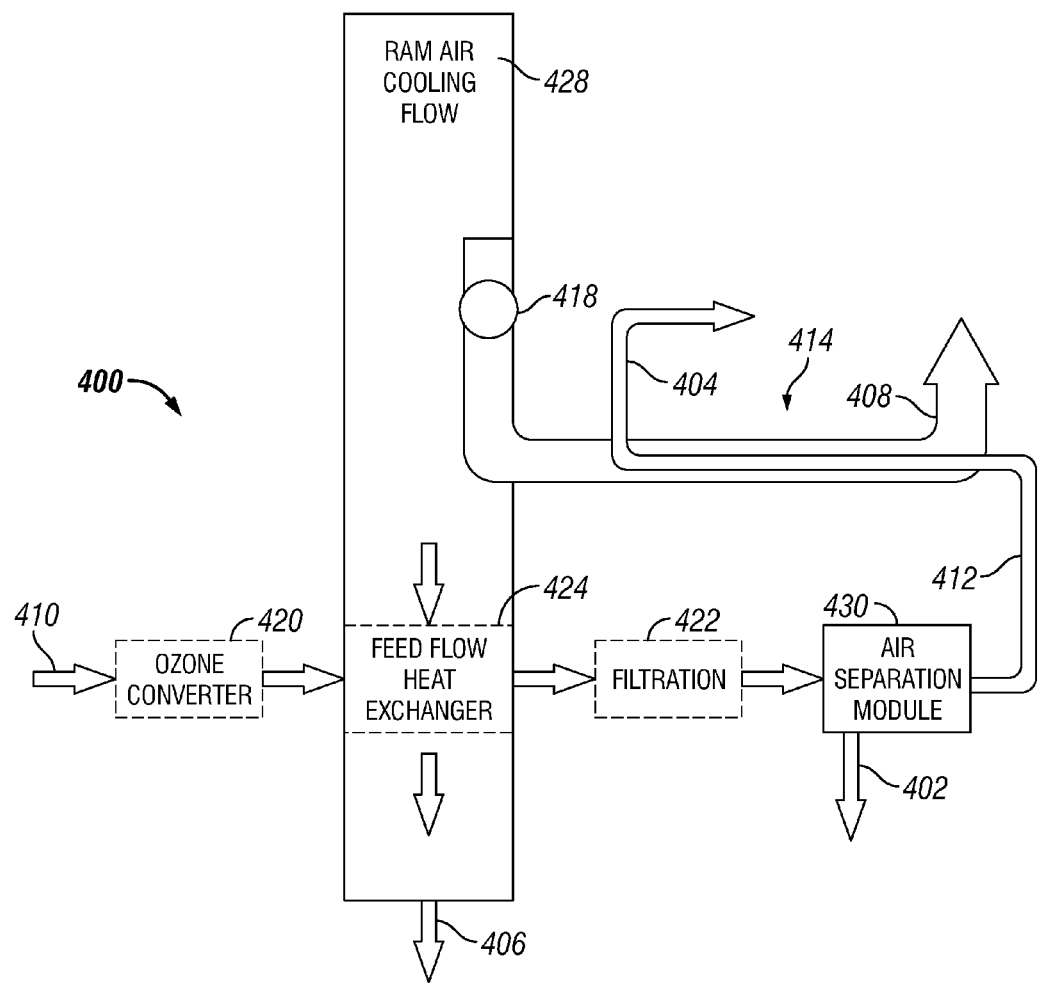

A variety of configurations for the methods and systems herein are shown in FIGS. 2-4. The ram duct mentioned herein could be one dedicated to the flammability reduction system or the ram duct could be one used for the Cabin Air Conditioning and Temperature Control System (CACTCS) ram duct with a higher flow rate than the one dedicated to an inerting system. The heat exchangers may be designed for maximum heat transfer with minimal weight, such as cross-flow or counter-current flow. A feed air heat exchanger may be temperature controlled either by controlling hot air or by controlling cold air, by controlling a flow of a bypass valve on the hot side, or modulating fan speed and/or ram air door modulation. A NEA flow heat exchanger incorporated in the ram ducting may be controlled similarly if temperature control is used. For system simplicity, NEA or OEA cooling might not use additional temperature control.

FIG. 2 shows a system 200 for aircraft fuel tank flammability reduction that includes an air separation module 230 producing NEA 212 and OEA 202. NEA 212 is substantially cooled in a NEA flow heat exchanger 226 to produce cooled NEA 204, which may be used in a fuel tank. NEA flow heat exchanger 226 uses a ram air cooling flow 228 in FIG. 2, though other sources for a cooling flow are described herein. Warmed ram air 206 (or other cooling flow that has been warmed) may be discarded overboard. OEA 202 may be discarded overboard or routed where oxygen is needed.

Optionally, system 200 may include a feed flow heat exchanger 224 when desired, as shown with dashed lines. Consequently, air feed 210 may be substantially cooled upstream from air separation module 230. NEA flow heat exchanger 226 is shown receiving the cooling flow downstream from feed flow heat exchanger 224. It will be appreciated that NEA flow heat exchanger 226 may receive the cooling flow upstream from or in parallel with feed flow heat exchanger 224, such as with a separate ram air duct dedicated to NEA cooling. Instead, NEA flow heat exchanger 226 may be integrated with feed flow heat exchanger 224.

Optionally, system 200 may include an ozone converter 220 and/or filtration 222, as shown with dashed lines. Ozone converter 220 may be placed in system 200 according to its operating temperature demands and may be integrated with filtration 222 or another system component. Additional pressurization via a turbo-compressor or electrically driven compressor may be included upstream from air separation module 230 if desired for a particular application.

FIG. 3 shows a system 300 for aircraft fuel tank flammability reduction that includes an air separation module 330 producing NEA 312 and OEA 302. In FIG. 3, a NEA flow heat exchanger is formed by an inner duct (NEA duct 314) inside an outer duct (ram air duct 316). NEA 312 flows through NEA duct 314 while flowing a ram air cooling flow 328 between NEA duct 314 and ram air duct 316 to produce cooled NEA 304, which may be used in a fuel tank. Heat transfer may be enhanced by enlarging duct surface area, for example by including fins. The NEA flow heat exchanger uses ram air cooling flow 328 in FIG. 3, though other sources for a cooling flow are described herein. Warmed ram air 306 (or other cooling flow that has been warmed) may be discarded overboard. OEA 302 may be discarded overboard or routed where oxygen is needed.

Optionally, system 300 may include a feed flow heat exchanger 324 when desired, as shown with dashed lines. Consequently, air feed 310 may be substantially cooled upstream from air separation module 330. NEA duct 314 is shown receiving the cooling flow upstream from feed flow heat exchanger 324. It will be appreciated that the NEA flow heat exchanger may receive the cooling flow downstream from or in parallel with feed flow heat exchanger 324, such as with a separate ram air duct dedicated to NEA cooling.

Optionally, system 300 may include an ozone converter 320 and/or filtration 322, as shown with dashed lines. Ozone converter 320 and any additional pressurization in system 300 may be placed in like manner as indicated above for system 200.

FIG. 4 shows a system 400 for aircraft fuel tank flammability reduction that includes an air separation module 430 producing NEA 412 and OEA 402. In FIG. 4 the NEA flow heat exchanger is formed by a double-walled duct 414 receiving forced ram air from a fan 418. NEA 412 flows through an inner duct of double-walled duct 414 while flowing ram air cooling flow 428 between the inner and an outer duct of double-walled duct 414 to produce cooled NEA 404, which may be used in a fuel tank. Heat transfer may be enhanced by enlarging duct surface area, for example by including fins. FIG. 4 shows counter-current flow in double-walled duct 414, but the flow could be concurrent. The NEA flow heat exchanger uses ram air cooling flow 428 in FIG. 4, though other sources for a cooling flow are described herein. Warmed ram air 406 (or other cooling flow that has been warmed, such as warmed ram air 408) may be discarded overboard. Warmed ram air 408 may rejoin the main ram flow for discarding or exit separately. OEA 402 may be discarded overboard or routed where oxygen is needed.

Optionally, system 400 may include a feed flow heat exchanger 424 when desired, as shown with dashed lines. Consequently, air feed 410 may be substantially cooled upstream from air separation module 430. Double-walled duct 414 is shown receiving the cooling flow in parallel with feed flow heat exchanger 424. It will be appreciated that the NEA flow heat exchanger may receive the cooling flow downstream from or upstream from feed flow heat exchanger 424.

Optionally, system 400 may include an ozone converter 420 and/or filtration 422, as shown with dashed lines. Ozone converter 420 and any additional pressurization in system 400 may be placed in like manner as indicated above for system 200.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted.

TABLE OF REFERENCE NUMERALS FOR FIGURES

| | |
|---|---|
| 100 | system |
| 102 | ASM |
| 104 | fuel tank |
| 106 | air source |
| 108 | permeate |
| 110 | air feed |
| 112 | nitrogen-enriched air |
| 200 | system |
| 202 | oxygen-enriched air |
| 204 | cooled, nitrogen-enriched air |
| 206 | warmed ram air |
| 210 | air feed |
| 212 | nitrogen-enriched air |
| 220 | ozone converter |
| 222 | filtration |
| 224 | feed flow HX |
| 226 | NEA flow HX |
| 228 | ram air cooling flow |
| 230 | air separation module |
| 300 | system |
| 302 | oxygen-enriched air |
| 304 | cooled, nitrogen-enriched air |
| 306 | warmed ram air |
| 310 | air feed |
| 312 | nitrogen-enriched air |
| 314 | NEA duct |
| 316 | ram air duct |
| 320 | ozone converter |
| 322 | filtration |
| 324 | feed flow HX |
| 328 | ram air cooling flow |
| 330 | air separation module |
| 400 | system |
| 402 | oxygen-enriched air |
| 404 | cooled, nitrogen-enriched air |
| 406 | warmed ram air |
| 408 | warmed ram air |
| 410 | air feed |
| 412 | nitrogen-enriched air |
| 414 | double-walled duct |
| 418 | fan |
| 420 | ozone converter |
| 422 | filtration |
| 424 | feed flow HX |
| 428 | ram air cooling flow |
| 430 | air separation module |
| 500 | module |
| 502 | shell |
| 504 | rim |
| 506 | feed port |
| 508 | feed |
| 510 | retentate port |
| 512 | retentate |
| 514 | permeate port |
| 516 | permeate |
| 518 | fiber(s) |
| 520 | element |
| 522 | inlet tubesheet |
| 524 | support |

What is claimed is:

1. An aircraft fuel tank flammability reduction method comprising:
   feeding pressurized air into an air separation module containing an oxygen separation membrane;
   contacting the separation membrane with the air feed, permeating oxygen from the air feed through the separation membrane, and producing nitrogen-enriched air from the air separation module as a result of removing oxygen from the air feed;

substantially cooling the nitrogen-enriched air (NEA) from the air separation module in a NEA flow heat exchanger downstream of the air separation module; and feeding the substantially cooled, nitrogen-enriched air into the fuel tank on board the aircraft.

2. The method of claim 1 wherein the separation membrane comprises a hollow fiber membrane and the air feed exhibits a normal operating temperature of at least 100° C. (212° F.).

3. The method of claim 1 further comprising a feed flow heat exchanger receiving the pressurized air from a source for the pressurized air and substantially cooling the air feed upstream from the air separation module.

4. The method of claim 3 further comprising directing a same cooling flow to the NEA flow heat exchanger and the feed flow heat exchanger.

5. The method of claim 4 wherein the cooling flow comprises ram air.

6. The method of claim 4 wherein the NEA flow heat exchanger receives the cooling flow upstream from the feed flow heat exchanger.

7. The method of claim 4 wherein the NEA flow heat exchanger receives the cooling flow downstream from the feed flow heat exchanger.

8. The method of claim 4 wherein the NEA flow heat exchanger receives the cooling flow in parallel with the feed flow heat exchanger.

9. The method of claim 4 wherein the NEA flow heat exchanger comprises an inner duct inside an outer duct, the method comprising flowing the nitrogen-enriched air through the inner duct and flowing the cooling flow of the NEA flow heat exchanger between the inner duct and the outer duct.

10. The method of claim 9 wherein the cooling flow of the NEA flow heat exchanger between the inner duct and the outer duct comprises the cooling flow to the feed flow heat exchanger.

11. The method of claim 1 further comprising feeding the pressurized air from a source for the pressurized air into the air separation module without substantially cooling the air feed in a heat exchanger.

12. The method of claim 1 wherein the NEA flow heat exchanger receives a cooling flow selected from among ram air, cabin air, cargo compartment air, ambient air, a cooling flow cooled by a skin heat exchanger, and a cooling flow cooled by an environmental control system.

13. The method of claim 1 wherein substantially cooling the NEA comprises passive, convective cooling by the NEA flow heat exchanger in a compartment containing the air separation module.

14. An aircraft fuel tank flammability reduction system comprising:

a source configured to produce pressurized air;

an air separation module configured to receive air feed from the pressurized air source;

an oxygen separation membrane in the air separation module configured to permeate oxygen from the air feed through the separation membrane and to produce nitrogen-enriched air (NEA) from the air separation module as a result of removing oxygen from the air feed;

a NEA flow heat exchanger downstream of the air separation module and configured to substantially cool the nitrogen-enriched air from the air separation module; and a fuel tank on board the aircraft configured to receive the cooled nitrogen-enriched air.

15. The system of claim 14 wherein the separation membrane comprises a hollow fiber membrane and is configured to permeate oxygen at a normal operating temperature of at least 100° C. (212° F.).

16. The system of claim 14 further comprising a feed flow heat exchanger configured to receive the pressurized air from the source for the pressurized air and to substantially cool the air feed upstream from the air separation module.

17. The system of claim 16 wherein the system is configured to direct a same cooling flow to the NEA flow heat exchanger and the feed flow heat exchanger.

18. The system of claim 17 wherein the system is configured to provide ram air as the cooling flow.

19. The system of claim 17 wherein the NEA flow heat exchanger is configured to receive the cooling flow upstream from the feed flow heat exchanger.

20. The system of claim 17 wherein the NEA flow heat exchanger comprises an inner duct inside an outer duct, the system being configured to flow the nitrogen-enriched air through the inner duct and to flow the cooling flow of the NEA flow heat exchanger between the inner duct and the outer duct.

* * * * *